United States Patent [19]
Katzakian, Jr. et al.

[11] 3,928,192
[45] Dec. 23, 1975

[54] BUFFERED, WEAK ION-EXCHANGE WATER DEMINERALIZATION PROCESS

[75] Inventors: Arthur Katzakian, Jr., Sacramento; David O. Depree, Loomis, both of Calif.

[73] Assignee: Aerojet-General Corporation, El Monte, Calif.

[22] Filed: June 6, 1974

[21] Appl. No.: 476,835

[52] U.S. Cl. .................. 210/30; 210/37; 210/38; 210/264
[51] Int. Cl.² .................. C02B 1/68; C02B 1/76
[58] Field of Search .......... 210/24, 36, 37, 38, 30, 210/269, 264; 260/2.2 R, 2.2 C

[56] References Cited
UNITED STATES PATENTS
| | | | |
|---|---|---|---|
| 2,837,488 | 6/1958 | Ferris | 260/2.2 R |
| 3,679,580 | 7/1972 | Boari et al. | 210/38 |

OTHER PUBLICATIONS
Ion Exchange Technology; Nachod et al.; Academic Press Inc.; 1956, p. 622.
Chemical Abstract, Vol. 64: 17999(e) (1966).

Primary Examiner—Charles N. Hart
Assistant Examiner—Benoit Castel
Attorney, Agent, or Firm—Edward O. Ansell

[57] ABSTRACT

A novel process for water demineralization involving the use of separate beds of weakly acidic cation exchange resin, weakly basic anionic exchange resin and a third column of weakly acidic cationic exchange resin. The first column of cation resin is buffered with a suitable base such as ammonia or an amine. When the saline feed is passed through the system, the cations of the feed are exchanged for the buffer, releasing buffered salts. The buffered salts when passed through the anion exchange column are split, releasing the buffer that is then deposited on the third cation resin column. The latter column is then used as the first separate bed during the next demineralization cycle. Thus, the buffer is internally looped, preventing contamination and also resulting in a saving of feed chemical. This process allows the efficient use of weak cation and anion exchange resins in a separate fixed-bed configuration. The process is adaptable to deionizing brackish water and tertiary waste water from sewage plants, to remove water soluble ions.

24 Claims, 2 Drawing Figures

BUFFERED, WEAK ION-EXCHANGE WATER DEMINERALIZATION PROCESS

BACKGROUND OF THE INVENTION

1. Field of the Invention

The present invention relates to the demineralization of brackish and waste water streams and, more particularly, to a process for removing salts from waste streams by the use of weak, regeneratable ion-exchange resins.

2. Description of the Prior Art

Water is becoming an increasingly scarce natural resource and with increasing population and industrial and commercial use of water, ionic pollution in the form of waste and by-product streams from industrial plants, refineries and municipal sewage is having a drastic effect on the ecological balance of lakes, rivers, streams and even the oceans. Ionic pollution is found to destroy the food chain of marine life and in some cases so upsets the biological balance as to cause hazards to swimmers and fishermen. Even low level ionic pollution in irrigation waters can have a drastic effect in terms of the accumulation of salts in the soil over extended periods of time. One of the main concerns of the present invention is to provide a method for demineralizing industrial and other waste streams prior to discharge into surface waterways. Water can be demineralized by many processes such as distillation, reverse osmosis, chemical precipitation or ion exchange. These processes, though all practiced commercially, suffer from limitations such as scaling and poor economics.

Since the development of commercially practicable synthetic ion exchange resins, ion exchange techniques have been the preferred methods for demineralizing water because of the high purity water produced, i.e. low TDS. However, the chemical costs for these systems have been quite high per unit of various salts removed. The ion exchange method which conventionally has been used consisted of the use of beds of strong acid cation exchanger in the hydrogen form in conjunction with beds of strong base anion exchanger in the hydroxyl form. The resin must be regenerated with strong acid or strong base, depending upon the nature of the chosen resin. In these prior art system, regeneration requires a considerable excess of regenerant and the original reaction does not proceed to completion, even though the regeneration may.

Deionization processes employing a weak acid and weak base resins are per se known to the art. Two very real advantages in using these weak resins are the achievement of very high regeneration efficiencies, and a high theoretical loading capacity. Both types of weak exchangers can easily and effectively be regenerated to high levels by employing amounts of regenerant only slightly in excess of stoichiometry.

Normally when the weak exchange resins are utilized, it is necessary to intimately mix the two so that an essentially neutral system is maintained, otherwise very little deionization takes place and the high theoretical loading capacity cannot be utilized. The following reaction sequence illustrates why these resins are normally used in a mixed bed.

Cation Loading

[a] $(RC-OH)_n + nNaCl \rightarrow (RC-ONa)_n + nHCl$
Cation Resin

[b] $(R_3N.HOH)_n + nHCl \rightarrow n(R_3NHCl) + n(H_2O)$
Anion Resin

Anion Loading
[c] $n(R_3N.HOH) + n(NaCl) \rightarrow (R_3NHCl)_n + n(NaOH)$
Anion Resin

[d] $NaOH + R(\overset{O}{\overset{\|}{C}}-OH)_n \rightarrow (R\overset{O}{\overset{\|}{C}}-ONa)_n + n(H_2O)$
Cation Resin where R = hydrogen, alkyl, aryl, alkaryl, aralkyl with the possibility of hetero atom substituents such as oxygen, chlorine, bromine, cyano, etc. on all but the hydrogen.

As the HCl is generated, [a] it is removed by the anion resin to give a neutral, salt-free stream [b]. The converse is true starting with the anion resin, [c+d]. If the counter-ion resin was not initially present, then the mineral acidity or basicity arising from resin interaction with the salt would quickly reverse the direction of equilibrium and no further ions would be removed according to the following:

[e] $RC-OH + NaCl \rightleftharpoons R\overset{O}{\overset{\|}{C}}-ONa + HCl$

The disadvantage in using prior weak cation and anion resin systems lies in the fact that each time the bed is loaded with salt, it becomes necessary to mechanically separate the two resins in order to regenerate them. This process is not always easy and limits one to the mixtures of resins that lend themselves to separation. Resin attrition in mixed bed systems becomes a significant factor in the useful life of the resin.

The separate beds of the buffer system described in this application, on the other hand, do not have these problems and allow a wide choice of resin combinations, while still allowing the practitioner to take advantage of the high theoretical loading capability, and to use any suitable resin regeneration technique.

SUMMARY OF THE INVENTION

The process of this invention allows the efficient use of weak "acid" cation and weak "base" anion exchange resins in a separated, fixed-bed or moving bed, both current and countercurrent configurations for the purpose of removing "soluble" water soluble salts dissolved in brackish and waste water streams. Thus, the process eliminates the separate equipment and operation to physically separate the two resin types prior to regeneration and also obviates the loss involved in attrition to the beads during this previously necessary step.

The instant process minimizes expenditures for chemicals by recycling all reagents required in the process and by otherwise limiting reagent losses. The process is with minimum modifications adaptable to the treatment of a wide variety of mineral containing streams and particularly to brackish water and tertiary waste streams from sewage plants. A further advantage of the instant process is that it is compatible with state of the art regeneration techniques.

Generally the process of the invention comprises the steps of passing the feed stock through a weak cation resin buffered with a suitable weak base, such as, an organic amine and exchanging the cations of the feed for the buffer cation. The released buffer cation and the anions of the feed water minerals and anion exchange resin combine to remove the anions, releasing hydroxyl ion to form buffer hydroxide (ie, the buffer in its free base form).

The released buffer is then deposited on a further bed of weak cation exchange resin which when loaded is used as the first bed of the next demineralization cycle while the first bed is regenerated.

Optionally, the resin columns may be provided in alternating pairs (head-tail sequence) of two cation resin columns in series with at least one anion resin column in further series with one or two cation resin columns. In another embodiment, the serial or carousel arrangement may comprise alternating cation and anion beds, both of which arrangements will be fully described hereinafter. Other preferred features of the invention relate to particular requirements on the basicities of each resin correlated to the structure and basicity of particular amines or other organic bases to optimize results.

The unique and flexible system of the invention will cleanse source water in unlimited quantity and will eliminate brine disposal if used in conjunction with specialized regeneration techniques now available. The instant systems can reduce the mineral content of the irrigation waters to prevent the loss of soil productivity and remove nitrates, phosphates and other ions which can foster algae growth. The systems can aid in the recovery of valuable minerals from manufacturing waste water, provide economical methods for tertiary treatment of waste water and have broad application in brackish water conversion. It can thus open up vast new sources of water that without economical proper treatment would be unusable or unfit for general use. Since our systems provide economies in waste tertiary treatment to remove dissolved, inorganic solids, they make possible the recycling of this water supply or reinjection of the treated water into ground reservoirs without lowering the overall water quality.

These and other features and advantages of the invention will become readily apparent as the invention becomes better understood by reference to the following detailed description when considered in conjunction with the accompanying drawings.

DESCRIPTION OF THE PREFERRED EMBODIMENTS

The invention may be illustrated by the following reactions:

```
                    Preparation
  I  R₃N.HOH + H(AC) → R₃N.H(AC) + H₂O
                   Cation Loading
 II  R₃N.H(AC) + MX → R₃N.HX + M(AC)
                   Anion Loading
III  R₃N.HX + (AN)HOH → R₃N.HOH + (AN)HX
                   Buffer Pick-Up
 IV  R₃N.HOH + H(AC) → R₃N.H(AC) + H₂O
where: H(AC)    = Cation resin, H form
       R₃N.HOH = Buffer
       MX      = Inorganic salt   M = cation   X = anion
       (AN)HOH = Anion resin, OH form
```

In reaction I, the weak cation resin in the lead column is buffered as by the addition of a hydrated amine to yield the amine salt of the resin and water.

In reaction II, the feed stock (MX) is passed through the column and the metal ion "M" displaces the amine by ion exchange and the amine acid salt is liberated.

In reaction III, the amine acid salt formed is passed through one or more anion columns, the number of columns being based on the embodiment being practiced, and the acid salt of the anion resin (AN)HX is formed with the liberation of hydrated amine buffer.

In reaction IV, the liberated amine buffer is picked up by the next cation resin column to form the buffered cation resin for recycling.

The loaded cation and anion resins can be regenerated by conventional means, i.e., mineral acids and bases or by new sophisticated techniques employing chelating agents and amines. Continuous operation can be achieved in accordance with either embodiment of the invention by providing a spare anion exchange bed and spare cation exchange bed which are placed on stream during regeneration of the two spent beds.

Figure 1:
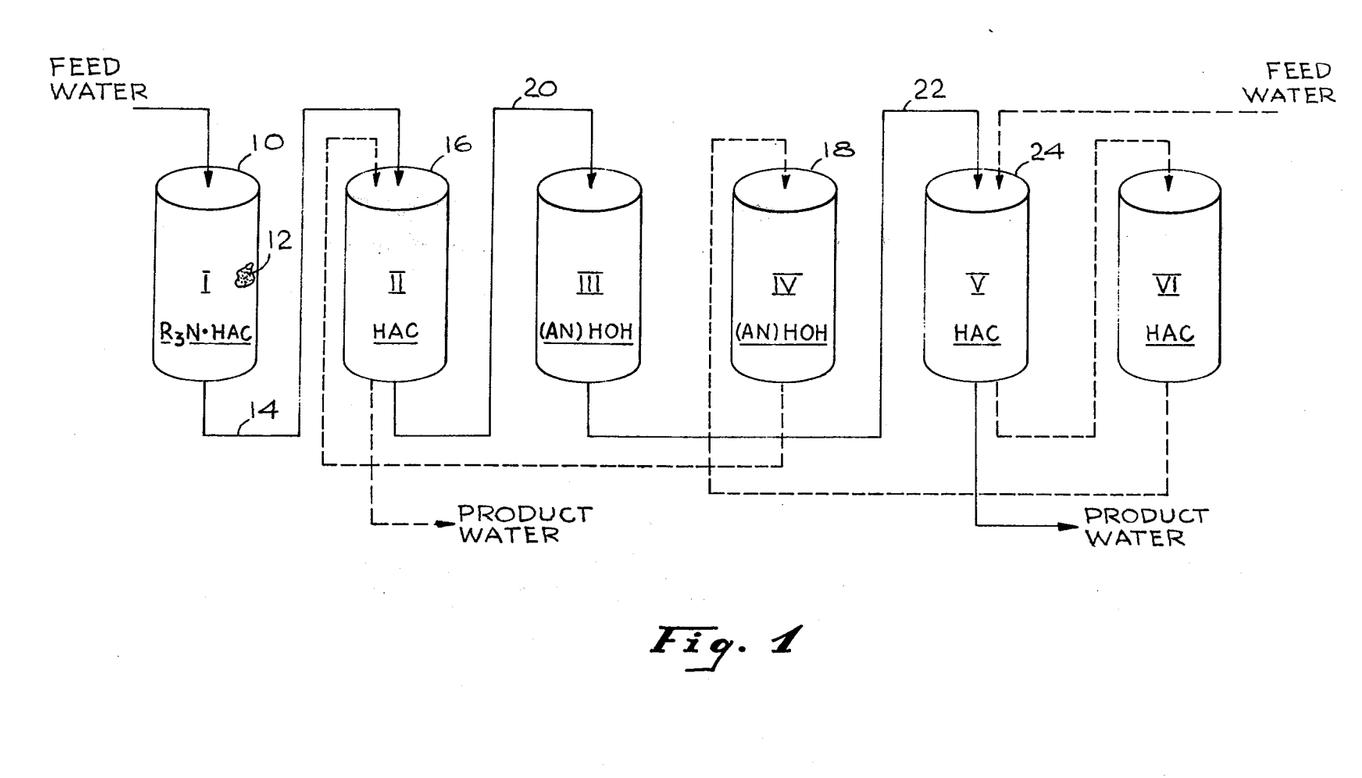
FIG. 1 is a schematic view of a first embodiment of the invention.

Referring now to FIg. 1, column I contains buffered cation resin; column II, the buffer bleed column, contains cation resin as does buffer pick-up column V and spare column VI. Columns III and IV contain anion resin; column III is the anion exchange column and consists in fact of one or more stages as required to insure adequate anion removal, based upon the chemical composition of the effluent from the first stage of column III. The term stage denotes one resin bed. Column IV is a spare column consisting of the same number of stages as column III. When feed water is passed through column I, 10, containing a fixed bed 12 of particles of amine buffered weakly acidic cation resin, the metallic cation displaces the buffer resulting in the formation of an amine acid salt effluent 14. As this buffer salt passes through column II, 16, a small part of the buffer is removed from the buffer acid salt to generate a small amount of mineral acidity. Column II also serves to retain any buffer that bleeds off of column I due to hydrolysis. The solution 20 from column II enters sequentially all the stages of column III where the anion is removed, and the buffer is released in its free base form. Any free mineral acidity generated in column II is also removed. The solution 22 which is now composed of water and basic buffer passes through column V, 24, where it is redeposited to form a buffered cation resin. After column I is exhausted, column II contains a small amount of buffer and column V is nearly buffered, and column III is loaded with anion, with the bulk of anion being deposited on the first stage. At this point, columns I and III are removed from service for regeneration. As shown in dotted lines, column V replaces column I to become the lead column. Column IV takes the place of Column III. Column VI replaces column II to become the buffer bleed column. Column II replaces column V as buffer pick-up column. By using this sequence, the process can be continuously run and the buffer is conserved in the system.

In another configuration (FIG. 2) for practice of the demineralization process, a plurality of cation and anion resin columns are alternated in a carousel arrangement in series with a paired arrangement, suitably at least 3 pairs, usually 4, with a fifth set as a spare. Initially, only the lead column in pair I is amine buffered. During loading with metal cation from the feed solution, the buffer is displaced primarily to the lead cation bed in pair II with a slight bleed to the lead cation column in pair III and only a trace bleed to the lead cation column in pair IV. For high quality water it is important that sufficient column pairs be used so that there is no bleed from the last pair when loading of the first pair is completed. This criterion places an optimum or maximum permissible loading of the first pair.

Figure 2:
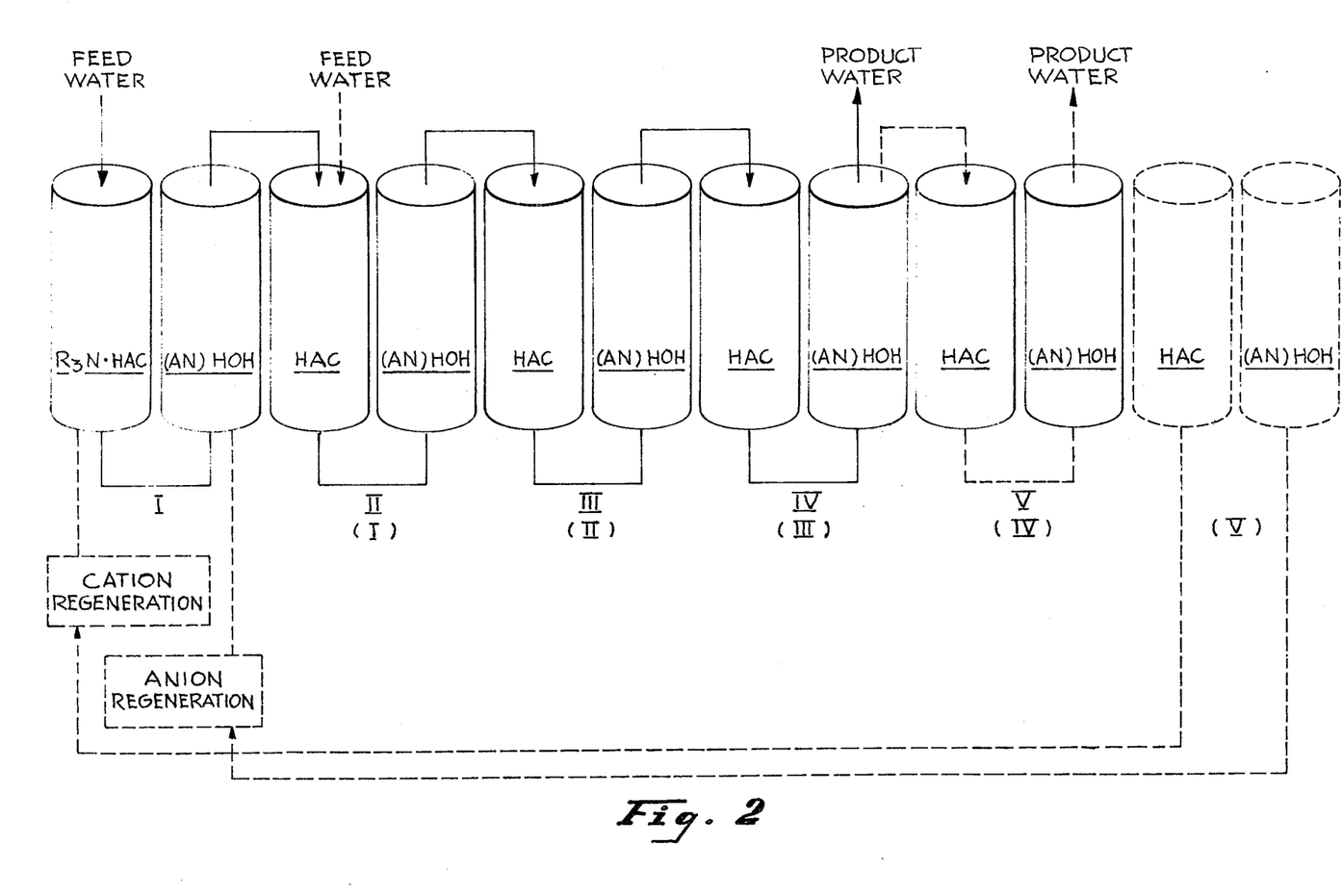
FIG. 2 is a schematic view of a second embodiment of the invention.

After both columns in pair I are loaded and the buffer is exhausted from the first cation column and all buffer has washed past the first pair, these columns are removed for regeneration and the columns in pair II become the lead pair of columns and the spare columns become the end columns. The columns in pair I after regeneration are placed in the position at the end of the "carousel".

In the second cycle, shown in dotted lines, the columns of pair II remove the bulk of the mineral ions from the feed stock. The liberated buffer is mainly picked up by the cation column in pair III. Any residual anions not picked up in pair II are picked up in the following pairs in decreasing concentration.

The process is applicable to removal of water soluble inorganic salts from water, mainly halides, sulphates, sulfites, phosphates, phosphites, carbonates, bicarbonates, nitrites and nitrates, of such metals as K, Na, Ca, Ba, Mg, Sn, Fe, Cu, Zn, Al, V, Cr, Mn and others. Excellent results are obtained with the Group IA and IIA alkali and alkaline earth metals, the most naturally occurring impurities, since these are difficult to remove by non-buffered processes. The process in both embodiments will also work on saline feeds containing mixtures of anions and/or cations.

The pK of the resins, both cationic and anionic should fall between about 3 and about 7.5. The resins are used in particulate bead form and may be large beads in the size range of 20–50 mesh or larger or small beads in the range of 40–80 mesh or smaller.

The weak cation-exchange resins which are particularly useful in the practice of this invention are those which contain carboxylic acid groups. These resins can conveniently be obtained by the copolymerization of compounds such as acrylic acid, methacrylic acid, acrylic esters, methacrylic esters, acrylonitrile or methacrylonitrile, and other unsaturated acrylates or nitriles with appropriate cross-linking agents such as divinylbenzene. If the resins are formed, however, from the polymerization of compounds containing ester or nitrile groups, hydrolysis to the corresponding acid must be effected prior to buffer addition. Further illustrations of the resins useful in the practice of the present invention and of methods for their preparation may be found by reference to U.S. Pat. Nos. 2,340,111; 2,371,818; 2,597,437; 2,885,371 and 2,963,453. In addition to the abovementioned ion-exchange resins, other weak-acid resins may be used. These resins may include those containing phosphonous, phosphonic, phosphinic or phosphoric acid groups and those resins which are made from phenol-formaldehyde condensates which also contain carboxylic acid groupings. The ion-exchange resins preferred at this time are those which derived acrylic or methacrylic acid.

Representative weak-acid resins are Amberlite IRC-50 (a carboxylic resin based on a methacrylic acid cross-linked copolymer) having a pK of 6.1, Bio-Rex 63 (moderately acidic, pK 3.0 approximately phosphonic acid polystyrene type) of Biorad Corporation, Chelex-100 (very weakly acidic, pK 6.0–7.0, iminodiacetic acid polystyrene type), and Duolite CC-3 (a polyacrylic acid having a pK of 5.57) of Diamond Shamrock Corp. Duolite CC-3 is favored due to high loading capacity.

Weak "base" ion-exchange resins are generally resins having primary amine, secondary amine or tertiary amine as the principal functional group. Typically the weak base polyamines are copolymers of acrylonitrile and methyl acrylate cross-linked with divinylbenzene and then subjected to aminolysis with polyamines; copolymers of styrene-divinylbenzene chloromethylates treated with primary or secondary amines; and reaction products of phenol-formaldehyde with a polyalkyleneamine. A weakly basic anion exchange resin may be defined as one which has a pK in water falling in the range of 3.0 – 7.0. Representative resins are shown in Table I.

Table I

| Anionic Resins | Composition | pK |
|---|---|---|
| ES-340 (Diamond Shamrock) | 85% Amine Functionality, 15% Quaternary, Amine/Epoxy Polymer Matrix, Gel Type | 6.49 |
| Dowex FDS-4024L (Dow Chemical) | Benzyl Dimethyl Amine Active Groups, Macroporous | 6.81 |
| Amberlite IRA-68 (Rhom & Haas) | Tertiary Amine Active Groups, Crosslinked Acrylic Matrix, Gel Type | 5.82 |
| Amberlite IRA-94 (Rhom & Haas) | Amine Functional Groups Styrene-Divinylbenzene Matrix, Macroporous | 6.77 |

Even though ES-340 and FDS-4024L have similar basicities, the former is preferred due to its capability of achieving rapid equilibration during deionication and loading in the range of 25–30%.

The criteria for the buffering agent to insure optimum loading of the resins and minimum loss of buffers are the following:
1. The buffer must be quantitatively displaced by the cations of the feed stream.
2. The buffer must be a sufficiently strong base so that displacement by hydrolysis and the resultant bleed is minimal.
3. The buffer must also be a sufficiently weak base such that its conjugate acid salts are sufficiently acidic to be efficiently split by the anion resin.

The preferred buffers for the process of this invention are not volatile at operating temperatures and therefore are not lost through volatilization which loss can only be overcome by pressurization at high expense. The preferred buffers combine the attributes of extremely high water solubility with this lack of volatility.

The loading efficiency of the cation column is a function of the buffer bleed which is in turn a function of the relative basicity of the buffer to the acid strength of the resin. In general, the pK of both the anion and cation resins should be as close as possible to 5. The pK of the buffer should preferably be within the range of 5 to 7. The lower the pK of the buffer, the more efficiently the cation resin will load because the tendency for hydrolytic bleed of the buffer is minimized. The higher the pK of the buffer, the more efficiently the anion resin will load. Therefore, the selection of the buffer should be made in conjunction with the strengths of the two resins, and the ease of loading of the inorganic salts to be removed, if such is known. Even if the pK of the anion resin is lower than that of the cation resin, the process of this invention is still operable provided both are within the 3 to 7 pK range.

Among the organic bases, the amines (substituted and unsubstituted) are particularly suitable herein as buffers. These amines may be selected from compounds of the formula:

where $R_1$ is alkyl, alkynyl, alkenyl, aryl, alkaryl, aralkyl, alkoxy, and may be substituted with hetero atoms or groups such as hydroxyl, ether, halogen, cyano, $R_2$ and $R_3$ are hydrogen or $R_1$, or $R_2$ and $R_3$ may be linked to form a cyclic structure. The molecular weight of the amine is preferably maintained below about 500 and preferably below 200 to avoid excessive swelling and deterioration of the resin particles. Preferred buffering agents have a pK in water at 25°C of 5 to 7. Especially suitable are the tertiary and secondary aliphatic amines, both substituted and unsubstituted, whose pK's are within this range. If the pK constant is greater than 5, ion exchange becomes less efficient than desirable. If the pK constant is greater than 7 hydrolysis by water to remove the amine becomes greater than desirable. Mixture of amines can also be utilized.

The anion splitting efficiency is also found to be a function of the buffer base strength (higher efficiency with weaker buffer) and the base strength of the resin. Optimum conditions require as high a base strength in the anion resin as is possible within the boundaries of the weak resin systems.

The efficiency with which organic amine buffers are displaced by cations from the feed stock (see Equation II above) is an important factor in the practice of this process for commercial purposes. The quantitative nature of the displacement reaction when organic amine buffers and substituted organic amine buffers are used, as compared to the non-quantitative displacement with ammonia, is shown in Example 1. It is to be seen that this efficiency of the displacement is reflected in the length of the transition zone during which breakthrough occurs, i.e., the leaking of the cation to be removed from the cation resin, the transition zone should therefore be as small as possible.

EXAMPLE 1

1. Three (3) 1 × 39 columns are charged with 0.55 eq. of CC-3 resin ($H^+$ form) each. To one column, 0.33 eq. (3.44 N soln.) of DMEA is added from the top at a rate of ~2.0 ml/min. To another column, 0.33 eq. (3.83 N) of $NH_3$ is added to the top at a rate of ~2.0 ml/min. To the third column, 0.33 eq. (3.86 N) of TMA is added to the top at a rate of ~2.0 ml/min. Each buffer solution is followed with ~100 ml $H_2O$ wash. The columns are then backwashed with $H_2O$ carefully to avoid mixing turbulence to relieve packing.

2. The three columns are run simultaneously. A 1000 ppm NaCl feed solution is to be fed into the columns. $[Cl^-] = 1.72 \times 10^{-2}N$ initially, $1.40 \times 10^{-2}N$ at 6,000 ml, $1.69 \times 10^{-2}N$ at 14,000 ml and $1.83 \times 10^{-2}N$ at 20,200 ml by $AgNO_3$ titration. The effluent from the columns was analyzed for amine and amine HCl through breakthrough as shown in the following table by titration of 50 ml samples against 0.10N HCl and .10N NaOH, respectively.

The transition zone is defined as that portion of the exchange cycle in which cation first appears in the eluate to when the buffer salt disappears. This zone should be as small as possible.

Table II

| Time, Min. | Val, ml | Col 1 (TMA) Amine, $\times 10^{-2}N$ | Amine HCl | Col 2 (DMEA) Amine, $\times 10^{-2}$ | Amine HCl | Col 3 ($NH_3$) Amine, $\times 10^{-2}$ | Amine HCl |
|---|---|---|---|---|---|---|---|
| 0 | 0 | 0 | 0 | 0 | 0 | 0 | 0 |
| 50 | 1,000 | φ | 1.52 | φ | 1.60 | φ | 1.57 |
| 231 | 3,000 | do.[1] | 1.65 | do. | 1.68 | do.[1] | 1.66 |
| 527 | 5,000 | do.[1] | 1.64 | do. | 1.73 | do.[1] | 1.68 |
| 716 | 7,000 | do.[1] | 1.40 | 0.1 | 1.45 | do.[1] | 1.48 |
| 810 | 9,000 | do.[1] | 1.37 | 0.08 | 1.44 | do.[1] | 1.42 |
| 906 | 11,000 | do.[1] | 1.36 | 0.116 | 1.44 | do.[1] | 1.41 |
| 1005 | 13,000 | do.[2] | 1.40 | 0.088 | 1.45 | do.[2] | 1.40 |
| 1110 | 15,000 | do.[2] | 1.61 | 0.096 | 1.73 | do.[2] | 1.60 |
| 1213 | 17,000 | do.[2] | 1.60 | 0.040 | 1.74 | do.[2] | 1.42 |
| 1308 | 19,000 | do. | 1.59 | 0.038 | 1.49 | do. | 1.16 |
| 1418 | 21,000 | do. | 1.64 | φ | 0.485 | do. | 1.02 |
| 1545 | 22,000 | do. | 1.66 | do. | 0.130 | do. | 0.92 |
| 1596 | 23,000 | do. | 1.71 | do.[3] | φ | do. | 0.76 |
| 1645 | 24,000 | do. | 1.26 | — | — | do. | 0.675 |
| 1796 | 25,000 | do. | 0.71 | — | — | do. | 0.56 |
| 1852 | 26,000 | do. | 0.245 | — | — | do. | 0.45 |
| 1907 | 27,000 | do.[4] | trace | — | — | do. | 0.39 |
| 1964 | 28,000 | — | — | — | — | do. | 0.38 |
| 2014 | 29,000 | — | — | — | — | do. | 0.252 |
| 2074 | 30,000 | — | — | — | — | do. | 0.186 |

[1] Very low concentration of strong acid detected (0.1 to 0.04 $\times 10^{-2}N$)
[2] Trace of strong acid detected via titration
[3] Col 2 (DMEA) stopped due to salt breakthrough
[4] Col 1 (TMA) stopped due to salt breakthrough
[5] do.=ditto The DMEA buffered column started salt breakthrough at 17,000 ml (+) and completed breakthrough by 23,000 ml. The transition zone<6000 ml.

$NH_3$ buffered columns began breakthrough at 15,000 ml (+). The transition zone continued for 15,000 ml (end of run), salt breakthrough not being complete at that point.

TMA - trimethylamine
DMEA - dimethyl ethanolamine
$NH_3$ - $NH_3$

Although TMA is not preferred as a buffer due to its volatility and pK of less than 5, there may be instances when one would desire to use it, as for instance because of its relatively low cost. TMA, a considerably stronger base than ammonia, is shown here to be more efficiently displaced by the cations of the feed than ammonia, and substantially equal to the displacement of the preferred type of amine, DMEA, which has a pK within the 5 to 7 range.

centage, and over 50% is considered to be an efficient split.

Table III

BUFFER PERFORMANCE

| | Buffer | pK | Feed Composition Solute | TDS, PPM | Cation Resin | Cation Buffer Level,% | Cation Resin Buffer Bleed, % Initial | 50 % pt | 90 % pt | Cation Loaded,% | Anion Resin | Anion Resin Splitting Efficiency % Anion Escape |
|---|---|---|---|---|---|---|---|---|---|---|---|---|
| 1. | N-methyl-Morph-oline(2) | 6.5 | NaCl | 150 | Duo-lite CC-3 | 60 | 91 | 21 | 10 | 24 | Amberlite IRA-68 | 29 |
| | Do(2) | | Ca(NO₃)₂ | 3000 | Do | 40 | 27 | 21 | 7 | 31 | Do | 25 |
| | Do(2) | | CaSO₄ | 2000 | Do | 36 | 0 | 9 | 0 | 38 | Do | 5 |
| | Do(2) | | CaSO₄ | 1000 | Do | 36 | 0 | 0 | 0 | 31 | Do | 0 |
| | Do(2) | | CaSO₄/Ca(NO₃)₂ 1/2 | 4500 | Do | 35 | 0 | 0 | 0 | 36 | Do | 5 |
| | Do(2) | | Ca,Mg,Na(4), SO₄, Cl,NO₃, NO₂ | 155 | Do | 35 | 28 | — | — | — | Do | — |
| | Do(3) | | NaCl | 1000 | Do | 100 | — | — | — | 20(5) | Dowex FDS-4024L | — |
| 2. | Morph-oline(2) | 5.67 | NaCl | 1000 | Do | 85 | — | — | — | 27 | Do | 72 |
| | Do | | NaCl | 1000 | Do | 100 | — | — | — | 56 | Amberlite IRA-68 | — |

(1)% of buffer acid salt not loaded on first anion column.
(2)Process Mode - Alternating cation and anion columns (carousel).
(3)Process Mode - Standard sequence, i.e. buffered cation column, bleed pick-up, anion columns, buffer pick-up column.
(4)Tertiary sewage effluent.
(5)Salt breakthrough due to anion resin inefficiency prevented completion of cation loading.
(6)Anion loading approximately 25% of capacity per column. ES-340 because it contains 15% quaternary sites does not split feed but breaks through sharply.

Suitable typical organic amine buffers within the preferred range include but are not limited to such as B-chlorotriethyl ammonium, 2,4-dimethylimidazol, 1-amino-isoquinoline, N-Methoxyethyl dimethyl amine, morpholine, N-methyl morpholine, 2,4,6-trimethylpyridine, strychnine, tyrosine amide, triethanolamine and diethanol amine, N-methanol diethanolamine, dimethylamine, and 2-pyridine dimethanol.

Other utilizable amines herein but which are outside the preferred pK range include 2,4-lutidine which has a pK of 7.01 and N,N-dimethyl ethanolamine which has a pK of 4.75. Further utilizable amines include trimethylamine (TMA) and dimethylamine (DMA) which are efficiently displaced but are excessively volatile and have pK's less than the preferred 5. Thus it is better to modify such compounds as by methoxylation to reduce the volatility and to alter the pK to be within the preferred range.

The amines can be used in combinations of two or more different amines. To prevent sequential deposition, however, the pK's should be substantially the same.

The performance of a series of buffers with various resin combinations is presented in the following table. The data presented includes buffer pK's, loading level of cation resins, buffer bleed (when measured), loading or in some cases salt splitting characteristics of the anion resin in the first anion column.

The term split refers to the capability of the anion resin to remove anion from the buffered acid salt and to release free buffer. Splitting efficiency is a measure of this capability. Splitting efficiency is recited as a per-

EXAMPLE 2

| | |
|---|---|
| Feed water | - 1100 ppm NaCl |
| Flow rate | - 18 ml/min |
| Buffer | - 2-dimethylamino ethanol |
| Column capacities | - 0.5 equiv. each |
| Column order: | |
| Columns 1 and 2 - Duolite CC-3 (polyacrylic acid) with No. 1 100% buffered and No. 2 20% buffered. | |
| Columns 3, 4, 5 and 6 - Duolite ES-340 (polytertiary amine) in basic form. | |
| Columns 7 and 8 - Duolite CC-3 in free acid form. | |

The progress of the run was measured by following the pH of the effluent streams from the cation and anion resins as well as by a conductivity (parts per million) cell at the end of all the columns.

~27 liters (~0.5 moles NaCl) of feed water was processed through the system resulting in deionized water having ~1–2 ppm dissolved solids and a pH of ~5. A sample was removed from column 1 at the end of the run and titrated with 0.1N NaOH solution to determine how much, if any, amine hydrochloride was coming off. The titration showed no amine hydrochloride was left on the column, indicating an approximately quantitative displacement of amine by sodium ion. Virtually 100% of the cation capacity was utilized and approximately 25% of the anion capacity was utilized. The freed buffer completely loaded onto the cation column following the anion column.

EXAMPLE 3

Loading of a mixed Na/Ca (60-40 equivalent ratio) feed with trishydroxy methylamino methane as buffer.

| Materials | Amount |
|---|---|
| Duolite CC-3 Resin (cation) | 0.20 eg/col. |

-continued

| Materials | Amount |
| --- | --- |
| IRA-47 Resin (anion) Amberlite | 0.20 eq/col. |
| Trishydroxy Methylamino Methane | 0.18 eq (21.8 gm) |
| NaCl 0.64 gm | |
| | per liter 1.80 × $10^{-2}$N feed |
| CaCl$_2$ 0.40 gm | |

1. 0.18 eq of the buffer is added as a 0.5N solution to a 24 × ¾ inch column containing the cation resin (49.6 ml) from the top at a rate of 5 ml/min.
2. 0.02 eq of IRA-47 (105 ml) is added to a second column of the same dimensions. The resin is washed with 1N NaOH followed by a water wash to a neutral pH effluent.

Salt breakthrough for column 2 occurred at 3500 ml of feed and for column 1 at 9500 ml of feed. IRA-47 is a weakly basic polyamine resin of Rohm & Haas.

EXAMPLE 4

$PO_4^{-3}$ loading of the following system was determined.

| Materials | Amount |
| --- | --- |
| Duolite CC-3 Resin | 0.55 eq (136 ml/col) |
| Amberlite IRA-68 Resin | 0.40 eq (250 ml/col) |
| Trishydroxy Methylamino Methane | 0.33 eq (40.0 gm) |
| Na$_3$PO$_4$ (1000 ppm) | 1.82 × $10^{-2}$N solution |

Six 39-inch columns were connected head to tail alternating the CC-3 resin with the IRA-68 resin. The first column was buffered with the indicated amount of buffer and the feed was fed to the top of the first column. Columns 1 and 2 were monitored for pH, amine and amine.H$_3$PO$_4$ and column 6 was monitored for ppm. Breakthrough at column 1 occurred at 28,000 ml of feed as indicated by a sharp rise in pH. The total salts content of the effluent was about 0.8 ppm throughout the run.

EXAMPLE 5

The bleed rate and effective salt spilling capability of N-β-hydroxyethylmorpholine and 2-pyridine dimethanol for CC-3 resin was determined as follows:

| Materials | Amount |
| --- | --- |
| Duolite CC-3 Resin 50 ml/col. | 0.205 eq/col. |
| 2,6-pyridine dimethanol (pKa = 9.72) | 0.102 eq. |
| N-β-hydroxyethylmorpholine (pKa = 6.96) | 0.102 eq. |

Each buffer as a 0.5N solution was run into a CC-3 charged 2 cm × 46 cm glass column from top to bottom at 1 cc/min. After all the buffer has been put through the column, the column was washed with 1 bed volume (50 ml) of water. A 1,000 ppm solution of NaCl was run through the column at 12.0 cc/min. and the effluent titrated for buffer and buffer.HCl.

The 2,6-pyridine dimethanol buffered column showed a salt breakthrough at about 5,000 ml of feed while the other column did not show breakthrough until 4250 ml of feed. The morpholine derivative buffered column loaded to 40% of resin capacity. The sodium loading was 25% of resin capacity. When an IRA-68 column was placed in series with the N-β-hydroxyethylmorpholine buffered column, the IRA-68 column loaded with Cl$^-$ to a level of 35% of resin capacity.

The following example describes the use of the instant process with cation exchange resins containing phosphonic acid groups.

EXAMPLE 6

Approximately 4.5 ml. of (14 meq. theoretical capacity) BIO REX 63, a styrene based polyphosphonic acid type cation exchange resin supplied by Bio Rad Laboratories is 80% buffered by treatment with 100 ml. of water containing 1.13 g. of N-methyl morpholine in a 10 ml. glass column.

When water containing 1000 ppm of sodium chloride is passed through this column the sodium ion is displaced by the buffer to yield the buffer hydrochloride. When the effluent is then passed through a second column containing Amberlite IRA-68 anion exchange resin, approximately 80% of the chloride ion is deposited whereby the free buffer in its hydrated form is released.

While the instant process is economically intended for operations for the removal of metallic ions of soluble metal salts of the Group Ia, IIa, and those previously specifically recited metals, it is seen that the process is equally operative to remove those metallic ions of soluble salts which are removeable without the use of a buffered system, for example by the process of U.S. Pat. No. 3,725,259 issued April 3, 1973. Such additionally removable metal ions include Co, Ag, Au and Cd.

It is to be understood that certain resins are known to have specific affinities for selected ions, both positive and negative. It is possible therefore to use a plurality of resins in a sequential manner, for either cation and-/or anion column use, to separate out specific ions known to exist in the feed stock more efficiently than if only one resin was used for the removal of all positive and all negative ions. A column is defined as that volume of resin in either single or multiple stages capable of removing the desired anion or cation from the feed.

The process of this invention is employable in continuous types of resin loading, for example countercurrent and concurrent fluidized beds with results comparable to those obtained in a fixed-bed configuration. The use of the continuous techniques may be preferred when large volumes of feed are to be treated, in order to reduce resin inventory and plant size. Any suitable means for regenerating both anion and cation resin utilized herein may be employed.

Throughout the course of this application numerous terms have been utilized which, while we believe are known to the art, will however, be defined herein below:

1. Buffer Bleed — the amount of buffer that is removed from the buffered cation column, or from the first buffered cation column if a series of buffered cation columns are employed, by hydrolysis rather than by ionic displacement by a metallic cation.
2. Transition Zone — the portion of a resin column in which breakthrough commences to the point of completion of break-through. The term may also be defined as that quantity of the column effluent in which the transition from buffer salt to metallic cation occurs.
3. Free Base — the buffer or the anion resin in a non-salt form, i.e., hydroxyl form.

4. Free Acid Form — The cation resin in its H⁺ form as opposed to its being loaded with metallic cation form.
5. Bleed percentage - the measured bleed amount at the point in time when 50% of the buffer originally loaded has been removed by the combined effects of displacement and bleed, divided by the amount of buffer liberated by displacement at that point in time, the number for such obtained, times 100.
6. 50% point — if a feed stream of 10 millequivalents of metallic ion is passed through a buffered cation resin and small aliquots from the effluent are taken and analyzed for buffer and metallic ion, at the 50% point of the displacement, i.e., when one-half of the buffer columns content have been shown to have been removed.
7. Splitting efficiency — the percentage of the cation resin's or ion resin's theoretical loading capacity which is loaded upon said resin when a specific acqueous solution of an ionic salt is passed through the resin.
8. do — ditto.

It is to be realized that only preferred embodiments of the invention have been described and that numerous substitutions, alterations and modifications may be made without departing from the spirit and scope of the invention as defined in the following claims.

We claim:
1. A process for demineralizing water comprising the steps of:
passing an amine buffer through a bed of weakly acidic cation exchange resin in hydrogen form to form a first bed containing an amine salt of the cation resin of the formula:

where H(AC) is the cation resin and $R_1$ is selected from the group consisting of alkyl, alkynyl, alkenyl, aryl, alkaryl, aralkyl, and alkoxy and may be substituted with hetero atoms or groups such as hydroxyl, ether, halogen or cyano; $R_2$ and $R_3$ are hydrogen or $R_1$; or $R_2$ and $R_3$ may be linked to form a cyclic structure;
passing feedwater containing mineral salts, of the formula MX, through said first amine salt bed and ionically exchanging the metal ion of the salt with the amine of the resin salt to form a first effluent containing an amine salt of the formula:

passing the first effluent through a second bed of weakly basic anion exchange resin and depositing the mineral anions thereon to form a second effluent containing said amine buffer, wherein the pK values of the cation exchange resin and anion exchange resin are between 3 and 7.5.
2. A process according to claim 1 in which the feedwater contains at least one soluble salt selected from the halides, sulfates, sulfites, phosphates, phosphites, carbonates, bicarbonates, nitrites and nitrates of K, Na, Ca, Br, Mg, Sn, Fe, Zn, Al, N and Cr.
3. A process according to claim 1 in which the feedwater contains dissolved salts of Group IA and IIA alkali and alkaline earth metals.
4. A process according to claim 1 in which the pK of both resins is about 5.
5. A process according to claim 1 in which the cation exchange resin contains carboxylic acid groups.
6. A process according to claim 1 in which the anion exchange resin is a weak base polyamine.
7. A process according to claim 1 in which the amine buffer is selected from dimethylamine, trimethylamine, N,N-dimethylethanolamine, brucine, B-chlorotriethyl ammonium, 2,4-dimethylimidazol, 1-amino-isoquinoline, morpholine, N-methyl morpholine, 2,4,6-trimethylpyridine, strychnine, tyrosine amide, 2,4-lutidine, 2-pyridine methanol and N-β-hydroxy-ethylmorpholine.
8. A process according to claim 1 in which the cation exchange resin contains phosphonic acid groups.
9. A process according to claim 1 wherein a mixture of amines is utilized as the buffer.
10. A process according to claim 1 in which the amine buffer is a weak base capable of being quantatively displaced by the cations of the feed, is sufficiently basic to minimize hydrolysis from the cation exchange resin salt of the buffer, is non-volatile at operating temperature of the cation exchange resin column and is a sufficiently weak base so that the salt thereof is efficiently split by the anion exchange resin.
11. A process according to claim 10 in which the pK of the buffer is from 5 to 7.
12. A process according to claim 10 in which the amine buffer has a molecular weight below about 500.
13. A process according to claim 1 further including the step of passing the second effluent through a third bed of weakly acidic cation exchange resin in hydrogen form and depositing the amine thereon to form an amine salt of the cation resin.
14. A process according to claim 13 in which the third bed when loaded with buffer is placed in the position of said first bed.
15. A process according to claim 14 further comprising the step of regenerating said first bed and placing it in the position of said third bed.
16. A water demineralization system comprising: a first column containing a first bed of amine salt of a weakly acidic cation exchange resin of the formula:

where H(AC) is the cation resin and $R_1$ is selected from the group consisting of alkyl, alkynyl, alkenyl, aryl, alkaryl, aralkyl, and alkoxy and may be substituted with hetero atoms or groups such as hydroxyl, ether, halogen or cyano; $R_2$ and $R_3$ are hydrogen or $R_1$; or $R_2$ and $R_3$ may be linked to form a cyclic structure;
feed means for passing feed water containing mineral salt, of the formula MX, through the first column to ionically exchange the metal, M, of the feedwater for the amine and form an amine salt of the mineral anion;

first effluent means receiving the amine mineral anion salt containing effluent from the first column;

a second column having an inlet connected to the first effluent and containing a second bed of weakly basic anion exchange resin for depositing the anions, X, thereon;

wherein the pK values of the cation exchange resin and anion exchange resin are between 3 and 7.5;

second effluent means for receiving the amine containing effluent from the second column;

a third column having an inlet connected to the second effluent means and containing a third bed of weakly acidic cation exchange resin for depositing said amine thereon and to form a demineralized third effluent third effluent means for removing the demineralized effluent from the third column.

17. A system according to claim 16 in which the buffer is a secondary or tertiary amine having a molecular weight below about 500.

18. A system according to claim 16 wherein a mixture of amines is utilized as the buffer.

19. A system according to claim 16 in which the cation exchange resin contains phosphonic acid groups.

20. A system according to claim 16 in which the ion-exchange resins are in the form of particles having a mesh size from 20–80.

21. A system according to claim 16 further including means for regenerating said columns.

22. A system according to claim 21 further including a fourth spare cation column and a fifth spare anion column, means connecting said first and second columns to said regeneration means when loaded with ions and means for connecting said fourth column as said third column and said fifth column as said second column.

23. A system according to claim 21 in which a plurality of at least three pairs of cation and anion columns are alternated as pairs in series and one of the lead cation columns of the first pair contains amine buffered cation resin.

24. A system according to claim 23 further including a spare pair of cation and anion resin columns and means for connecting the first pair to the regeneration means, the second pair to the feed water, and the spare pair to the last pair in said series.

* * * * *